United States Patent
Has et al.

(10) Patent No.: US 11,486,974 B2
(45) Date of Patent: Nov. 1, 2022

(54) LIDAR DEVICE AND METHOD HAVING SIMPLIFIED DETECTION

(71) Applicant: Robert Bosch GmbH, Stuttgart (DE)

(72) Inventors: Remigius Has, Grafenau-Daetzingen (DE); Annemarie Holleczek, Stuttgart (DE); Matthias Baier, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 16/612,586

(22) PCT Filed: Apr. 18, 2018

(86) PCT No.: PCT/EP2018/059942
§ 371 (c)(1),
(2) Date: Nov. 11, 2019

(87) PCT Pub. No.: WO2018/206251
PCT Pub. Date: Nov. 15, 2018

(65) Prior Publication Data
US 2020/0132816 A1 Apr. 30, 2020

(30) Foreign Application Priority Data

May 12, 2017 (DE) .......................... 102017208047.7

(51) Int. Cl.
*H04B 10/00* (2013.01)
*G01S 7/481* (2006.01)
(Continued)

(52) U.S. Cl.
CPC .......... *G01S 7/4817* (2013.01); *G01S 7/4814* (2013.01); *G01S 17/42* (2013.01); *G02B 5/10* (2013.01); *G02B 26/0833* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 8,681,319 B2 * 3/2014 Tanaka .................... G01S 17/42
356/3.01
8,836,922 B1 * 9/2014 Pennecot ................ G01S 17/42
356/9
(Continued)

FOREIGN PATENT DOCUMENTS

DE 102010047984 A1 4/2012
DE 102012102244 A1 10/2012
(Continued)

OTHER PUBLICATIONS

International Search Report for PCT/EP2018/059942, dated Jul. 26, 2018.

*Primary Examiner* — Hanh Phan
(74) *Attorney, Agent, or Firm* — Norton Rose Fulbright US LLP; Gerard Messina

(57) ABSTRACT

A LIDAR apparatus for scanning a scan region with at least one beam is described. The LIDAR apparatus includes at least one beam source for generating the at least one beam; having a mirror for deflecting the at least one generated beam toward the scan region; and having a detector mirror for deflecting at least one beam, reflected at an object, onto a defined region of a detector, the mirror and the detector mirror being disposed on a rotor rotatably around a vertical rotation axis, and the detector mirror focusing the at least one reflected beam onto the detector. A method for operating a LIDAR apparatus is also described.

10 Claims, 2 Drawing Sheets

(51) Int. Cl.
*G01S 17/42* (2006.01)
*G02B 5/10* (2006.01)
*G02B 26/08* (2006.01)

(58) Field of Classification Search
CPC ... H04B 10/1149; H04B 10/40; G01S 7/4817;
G01S 17/42; G01S 17/08; G01S 7/4814;
G01S 17/10; G01S 7/486; G02B 26/0833;
G02B 26/10
USPC ....... 398/169, 170, 118, 119, 127, 128, 129,
398/130, 131, 135, 136, 158, 159, 172;
356/5.01, 3.01, 4.1, 4.01
See application file for complete search history.

(56) References Cited

U.S. PATENT DOCUMENTS

| | | | |
|---|---|---|---|
| 10,571,574 B1 * | 2/2020 | Yavid | G01S 17/89 |
| 2009/0123158 A1 | 5/2009 | Ray et al. | |
| 2017/0003392 A1 | 1/2017 | Bartlett et al. | |
| 2022/0050203 A1 * | 2/2022 | David Keilaf | G01S 7/484 |

FOREIGN PATENT DOCUMENTS

| | | |
|---|---|---|
| DE | 102015013710 A1 | 4/2017 |
| EP | 2065724 A2 | 6/2009 |
| JP | H08122060 A | 5/1996 |
| JP | H08122061 A | 5/1996 |
| JP | H09184879 A | 7/1997 |
| JP | H10325872 A | 12/1998 |
| JP | 2002071809 A | 3/2002 |
| JP | 2009098111 A | 5/2009 |
| JP | 2013205094 A | 10/2013 |

* cited by examiner

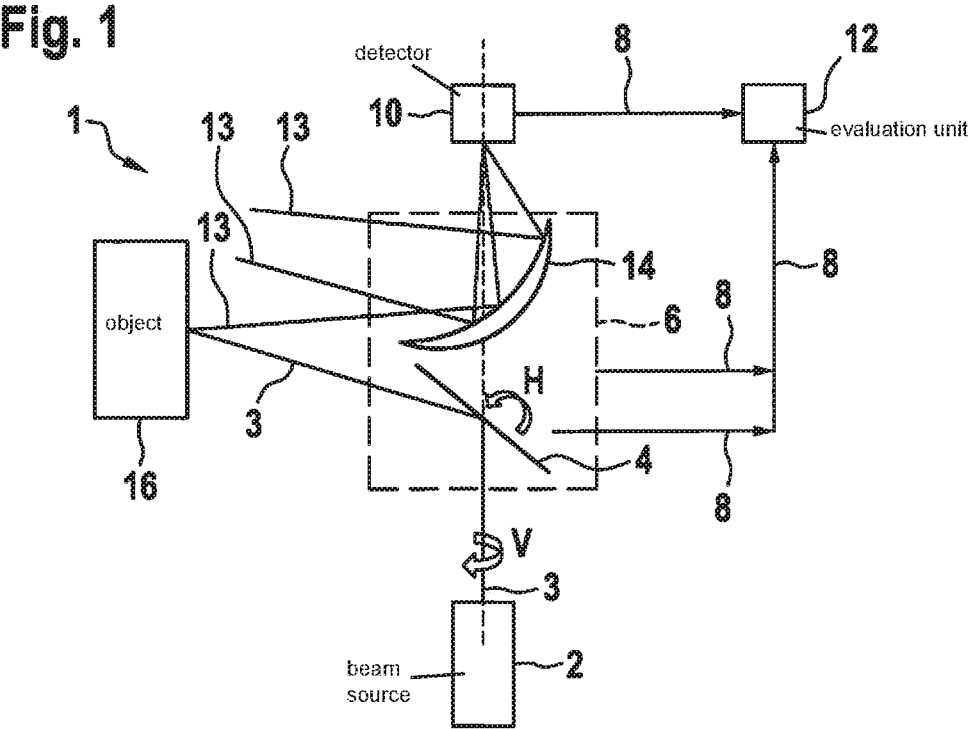
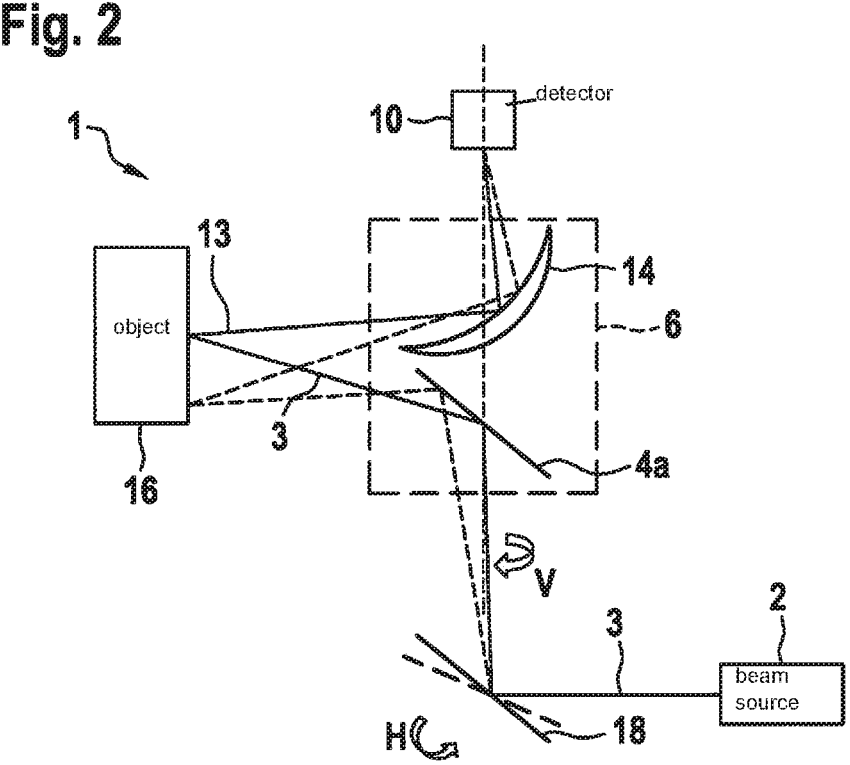

LIDAR DEVICE AND METHOD HAVING SIMPLIFIED DETECTION

FIELD

The invention relates to a LIDAR apparatus for scanning a scan region with at least one beam, and to a method for operating a LIDAR apparatus.

BACKGROUND INFORMATION

LIDAR (light detection and ranging) apparatuses generate light beams or laser beams and then deflect them. Defined vertical and horizontal scan angles, which span a scan region, are scanned with the beams. A beam source is often disposed in stationary fashion for that purpose. The beams that are generated are directed onto a deflection unit rotatable around a rotation axis and deflected there, by a pivotable mirror, toward the scan region. Beams reflected at objects can then be received by a receiving optical system and directed onto detectors. Stationary detectors can be shaped rotationally symmetrically in order to enable positional resolution of the reflected beams. In this context, the received beams are directed onto detector cells of the rotationally symmetrically shaped detector. Such detectors are usually embodied in the form of concentric rings having a plurality of detector cells. Alternatively, rectangularly shaped detectors such as CMOS sensors can also be used; evaluation of the detected beams of such a sensor is complex. Detectors of LIDAR apparatuses are therefore usually complex in terms of construction or shape, or must be evaluated using a complicated evaluation method.

SUMMARY

An object on which the present invention is based can be regarded as that of providing a method and a LIDAR apparatus for scanning a scan region, having a decreased rotating mass and a reduced detector size.

The object may be achieved by way of example embodiments of the present invention. Advantageous embodiments of the present invention are described herein.

According to one aspect of the present invention, a LIDAR apparatus for scanning a scan region with at least one beam is furnished. The LIDAR apparatus has at least one beam source for generating at least one beam, and a mirror for deflecting the at least one generated beam toward the scan region. The LIDAR apparatus furthermore has a detector mirror for deflecting at least one beam, reflected at an object, onto a region of the detector, the mirror and the detector mirror being rotatable via a rotor around a vertical rotation axis, and the detector mirror focusing at least one reflected beam onto the detector.

Beams that are scattered back or reflected to the LIDAR apparatus from different directions of incidence can thereby be directed and focused by the detector mirror onto the detector. The scan region can be scanned in pulsed fashion by the fact that at least one beam is generated and then a reflection of the generated beam is detected. Each generated beam is utilized in order to illuminate a portion of the scan region in point-like or area fashion. The at least one reflected beam is then focused by the detector mirror onto the detector. This sequence then begins again, with the mirror directing the generated beam onto a different sub-region of the scan region. The detector is designed to detect at least one reflected beam and its intensity. Information regarding a location from which the reflected beam is coming is not ascertained by the detector, but is assigned subsequently to the detected beam based on the orientation of the mirror or of the illuminated sub-region. Positional resolution can thereby be implemented for the LIDAR apparatus by the beam source in combination with an orientation of the mirror or of the deflection unit, and not by a detector. For example, a laser spot or a pulsed beam can be directed onto a mirror that can be, for instance, an oscillating micromirror (MEMS). Any desired vertical resolutions can be enabled by way of a pulse frequency of the beam source and an oscillation frequency of the mirror. All the reflected beams are directed onto the detector. Thanks to the focusing of the reflected beams onto the entire detector, the location on the detector at which a reflected beam is detected is not critical. As a result, the detector can be embodied in technically simple fashion, and the evaluation of measured signals of the detector is simplified. The measured signal detected by the detector can be associated, for example, with an illuminated sub-region of the scan region as a function of the orientation of the mirror and the emission direction, ascertained therefrom, of the at least one generated beam. A scan region can thus be illuminated stepwise or continuously, for example in serpentine fashion or in the form of an interface method of the like. The detector mirror and the mirror for deflecting the generated beams can be driven by the rotor, for example, or can be rotatable as parts of the rotor. Because only these two components are disposed on the rotor, the rotating mass of the rotor is low. In addition, only a few electrical leads are necessary (bilaterally) to and from the rotor.

According to an example embodiment of the LIDAR apparatus, the detector mirror focuses reflected beams of a return beam region onto the detector. Reflected beams from the return beam region can thereby be directed onto the detector. The return beam region preferably corresponds to the scan region of the LIDAR apparatus. In particular, the detector can be configured to be smaller in this context, since reflected beams no longer acquire their positional assignment or resolution by way of the detector.

In accordance with an example embodiment of the LIDAR apparatus, the detector mirror has a focal length, the detector being disposed at a focal point of the detector mirror. The detector mirror is designed in such a way that it images all the reflected beams at its focal point. All the reflected beams can thus be imaged at a single point, or in positionally concentrated fashion, onto a defined region of the detector. Positioning the detector at the focal point of the detector mirror allows the detector to be embodied to be very small.

In accordance with a further example embodiment of the LIDAR apparatus, the detector is embodied as a point detector. Because the reflected beams are imaged by the detector mirror in highly concentrated fashion at the focal point regardless of an angle of incidence of the reflected beams, the detector can be embodied as a point detector, for example an avalanche photodiode.

According to a further example embodiment of the LIDAR apparatus, the mirror is pivotable around a horizontal rotation axis. Oscillation around a horizontal rotation axis allows the mirror to deflect a generated beam along a vertical angle. As a result, a vertical scan angle can be illuminated or scanned stepwise, in continuous or stepwise fashion, by at least one generated beam. The mirror can oscillate at any frequency, and can deflect generated beams along the vertical scan region toward the scan region. Because the mirror is disposed on the rotor, the at least one beam can also be deflected over any horizontal scan angle with the aid of a superimposed rotational motion around the vertical rotation axis. The horizontal scan angle and the vertical scan angle span the scan region.

In accordance with a further example embodiment of the LIDAR apparatus, a stationary mirror pivotable around a horizontal rotation axis deflects at least one generated beam onto the mirror that is rotatable around the vertical rotation axis. The mirror that is pivotable around a horizontal rotation axis is disposed statically or outside the rotor, and directs the at least one generated beam at different angles onto a mirror that is disposed passively on the rotor and, thanks to the rotor, can perform a rotation or a pivoting motion around the vertical rotation axis. Besides the detector mirror, only the passive mirror is therefore positioned on the rotor. Only passive components, which do not require transfer of energy or data, are thus disposed on the rotor. The rotor is thus of simpler technical configuration and is less fault-susceptible. The mirror, which is stationary, in particular is not rotatable around a vertical rotation axis, can deflect the at least one beam along a horizontal scan angle by way of a pivoting motion around the horizontal rotation axis, and can illuminate the scan region by way of the passive mirror positioned on the rotor.

According to a further example embodiment of the LIDAR apparatus, at least one optical element guides the at least one deflected beam over the passive mirror that is rotatable around the vertical rotation axis. The beams that are generated, which are deflectable by the stationarily disposed mirror that is pivotable around a horizontal rotation axis, can thereby be optimally guided onto the passive mirror disposed on the rotor. In particular, the passive mirror can be optimally illuminated, and possible losses, for example due to generated beams that miss the passive mirror, can be reduced. The optical element can be, for example, a lens system that can also be disposed in part on the rotor and in part statically.

According to a further preferred example embodiment of the LIDAR apparatus, the detector mirror is a free-form mirror. The detector mirror can be adapted to a geometry and an application of the LIDAR apparatus. In particular, the detector mirror can have an adapted curvature and shape based on possible space conditions within the apparatus, so that regardless of their angle of incidence, all reflected beams can always be focused onto one point or at least onto a region having a limited area. The detector mirror can preferably be disposed on the rotor and can be embodied, for example, as a parabolic mirror. The detector can thus be placed in stationary fashion outside the rotor and can be embodied to be small or point-like. The detector and the detector mirror must be positioned for that purpose in such a way that they are disposed oppositely on the vertical rotation axis.

According to a further aspect of the present invention, a method for operating a LIDAR apparatus for scanning a scan angle with at least one beam is provided. In one step, at least one beam is generated. The at least one generated beam is then deflected along a horizontal scan angle and a vertical scan angle, at least one beam reflected at an object being focused by a detector mirror onto a detector.

The at least one generated beam can be deflected along the horizontal scan angle, continuously or stepwise, by a mirror disposed on a rotor. A detector mirror is likewise disposed on the rotor. The detector mirror has a curved or shaped mirror surface. The detector mirror is preferably a free-form mirror, for example a parabolic mirror. The detector mirror can thus deflect reflected incoming beams and focus them in such a way that the reflected beams always strike a defined detector area of the detector. This occurs preferably independently of an angle of incidence of the reflected beams. According to the method, a respective beam is generated in pulsed fashion and is transmitted into the scan region by way of a vertical and horizontal excursion of a mirror. Beams that are then reflected are directed onto the detector and recorded there. This operation can then be repeated as desired for different excursions of the mirror. The result is that the detector performs only the function of recording or detecting reflected beams. Information with respect to a location or an explicitly illuminated sub-region of the scan region can be assigned to the reflected and detected beam based on the excursion of the mirror. The complexity of the detector, and of a process of evaluating the detector, can thereby be reduced. A detector of this kind can furthermore be embodied to be smaller or more compact.

In accordance with an example embodiment of the method, each reflected beam from a return beam region is focused with pinpoint accuracy onto the detector. All the reflected beams are focused into one point. That point can preferably be a focal point of the detector mirror. The detector can thus be embodied as a point detector. For example, the detector can be an avalanche photodiode.

Preferred example embodiments of the present invention are explained in further detail below with reference to highly simplified schematic depictions.

BRIEF DESCRIPTION OF THE DRAWINGS

FIG. 1 schematically depicts a LIDAR apparatus in accordance with a first example embodiment.

FIG. 2 schematically depicts a LIDAR apparatus in accordance with a second example embodiment.

DETAILED DESCRIPTION OF EXAMPLE EMBODIMENTS

Figure 3:
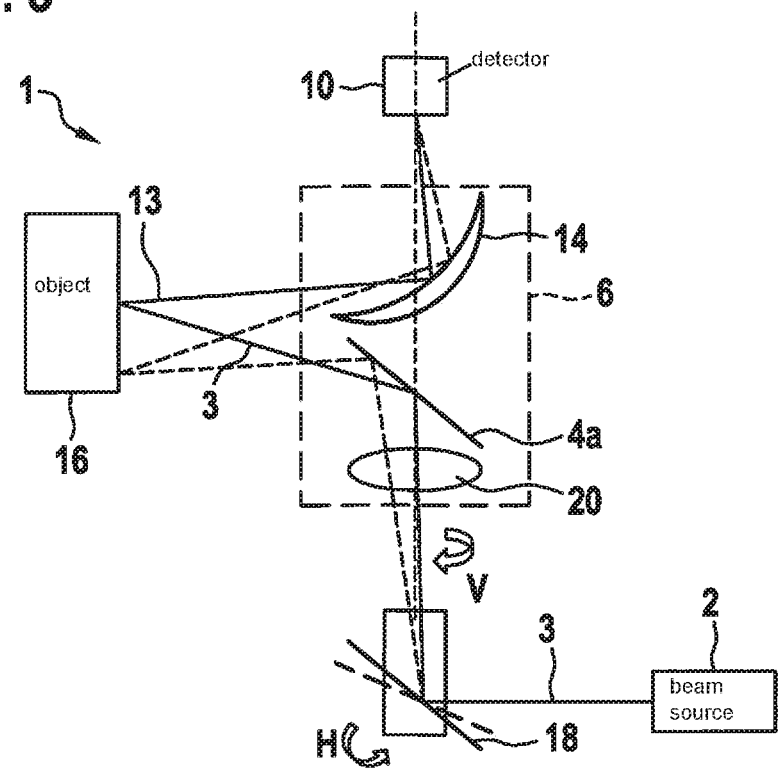
FIG. 3 schematically depicts a LIDAR apparatus in accordance with a third example embodiment.

In the Figures, the same design-related elements respectively have the same reference numbers.

FIG. 1 is a schematic depiction of a LIDAR apparatus 1 in accordance with a first example embodiment. LIDAR apparatus 1 has a beam source 2 for generating pulsed beams 3. In accordance with the example embodiment, beam source 2 is an infrared laser 2 that generates laser beams 3 having a defined pulse duration at specific time intervals. The generated beams 3 are generated congruently with a vertical rotation axis V and are emitted onto a mirror 4 that is pivotable around a horizontal rotation axis H. Mirror 4 is positioned on a rotor 6 rotatable around vertical rotation axis V, and deflects the generated beams 3 into a scan region or emits the generated beams 3 out of LIDAR apparatus.

Rotor 6 is rotated, continuously or stepwise, via a drive mechanism (not shown). Data leads 8 as well as electrical leads are provided in order to control a pivoting of mirror 4 and the rotation of rotor 6. Data leads 8 are connected to mirror 4, to rotor 6, to a detector 10, and to an evaluation unit 12. A detector mirror 14 is also disposed on rotor 6. According to the example embodiment, detector mirror 14 is a parabolic mirror 14. Detector mirror 14 can reflect beams 13, reflected at an object 16 from different directions of incidence, in such a way that the reflected beams 13 are focused into a focal point. The focal point is at a distance from detector mirror 14 which corresponds to a focal length of detector mirror 14. Detector 10 is likewise at a distance corresponding to the focal length of detector mirror 14. In particular, a detector area of detector 10 is located at a focal point of detector mirror 14. In accordance with the example embodiment, detector 10 is a point detector in the form of an avalanche photodiode. In order for the focal point of detector mirror 14 to be independent of an orientation of rotor 6, the focal point of detector mirror 14 and a detector area of detector 10 must be located on vertical rotation axis V.

In the interest of simplicity, vertical rotation axis V and horizontal rotation axis H are named with reference to an orientation and position of LIDAR apparatus 1 in the Figures, and need not obligatorily extend vertically or horizontally. The rotation axes can instead be interchanged or can be disposed diagonally, in accordance with a positioning of LIDAR apparatus 1. Vertical rotation axis V and horizontal rotation axis H are, however, always disposed orthogonally to one another.

Beams 3 that are generated in pulsed fashion are emitted into different sub-regions of scan region from mirror 4 in accordance with the excursion of the latter and the position of rotor 6. Reflected beams 13 of generated beams 3 can then be recorded by detector 10. Detector 10 can only ascertain an intensity of the reflected beam and forward it, as an electrical measured signal, to evaluation unit 12. Evaluation unit 12 ascertains the position of mirror 4 and of rotor 6 for a generated beam 3 pertaining to a reflection 13 that is to be detected. Based on this information, a positional dependence can be assigned to the detected beam, and the sub-region of the scan region can be identified.

FIG. 2 schematically depicts a LIDAR apparatus 1 in accordance with a second example embodiment. In contrast to the first example embodiment, LIDAR apparatus 1 has a pivotable mirror 18 that is disposed in stationary fashion outside rotor 6. In accordance with the example embodiment, pivotable mirror 4a is embodied passively and is positioned in a defined position on rotor 6. Energy leads and data leads that connect possible components on rotor 6 can thus be omitted, and LIDAR apparatus 1 can be technically simplified.

Mirror 18 that is disposed in stationary fashion directs beam 3, generated by beam source 2, onto passive mirror 4a that is positioned on rotor 6. The generated beam 3 is directed onto different regions of passive mirror 4a as a result of the pivoting of mirror 18. An angle of incidence of the generated beam 3 onto passive mirror 4a is thereby varied by mirror 18. In accordance with the angle of incidence of the generated beam 3, a vertical scan angle is covered, or the scan region is illuminated in its vertical extent, as a function of the pivoting of mirror 18. In accordance with the example embodiment, it is pivotable mirror 18, instead of beam source 2, that is disposed on vertical rotation axis V opposite passive mirror 4a on rotor 6. An alternative excursion of mirror 18, with a correspondingly modified beam path of generated beam 3 and of reflected beam 13, is depicted with dashed lines for illustration.

FIG. 3 schematically depicts a LIDAR apparatus 1 in accordance with a third example embodiment. In contrast to the second embodiment, LIDAR apparatus 1 here has an additional optical element 20. Optical element 20 is disposed on rotor 6 between passive mirror 4a and pivotable mirror 18. Optical element 20 serves as a beam directing element and directs the generated beams 3 that are directed by pivotable mirror 18 onto passive mirror 4a. Optical element 20 serves in particular to correct the generated beams 3 and to optimize a beam path of the generated beams 3 onto passive mirror 4a.

Figure 4:
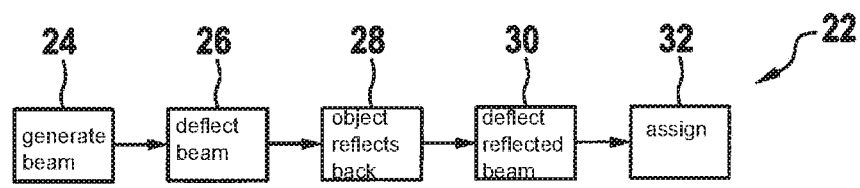
FIG. 4 shows a method for operating a LIDAR apparatus in accordance with the first example embodiment.

FIG. 4 illustrates a method 22 for operating a LIDAR apparatus 1 in accordance with the first example embodiment. At least one beam 3 is generated 24 and emitted onto a pivotable mirror 4 by beam source 2. The generated beam 3 is deflected 26 by pivotable mirror 4 along the vertical scan angle. Because mirror 4 is disposed on a rotor 6, the generated beam 3 is also deflected 26 along the horizontal angle. When a beam 3 emitted into the scan region strikes an object 16 or an obstacle, at least a portion of the generated beam 3 is reflected back 28 as a reflected beam 13 to the LIDAR apparatus. Reflected beam 13 is received by detector mirror 14 and deflected 30 in focused fashion onto detector 10. Based on the orientation of mirror 4 and of rotor 6 upon deflection 26 of the generated beam 3, a positional resolution or a defined region of the scan region can be assigned 32 by evaluation unit 12 to the deflected 30 beam.

What is claimed is:

1. A LIDAR apparatus for scanning a scan region with at least one beam, comprising:
    at least one beam source to generate beams, which are pulsed having a pulse duration at specific time intervals;
    a mirror to deflect the generated beams toward the scan region; and
    a detector mirror to deflect at least one reflected beam, which is reflected at an object, onto a defined region of a detector;
    wherein the mirror and the detector mirror are rotatable via a rotor around a vertical rotation axis, and wherein the detector mirror focuses the at least one reflected beam onto the detector,
    wherein the generated beams are generated congruently with a vertical rotation axis and emitted onto the mirror, which is pivotable around a horizontal rotation axis, wherein the mirror is positioned on a rotor, which is rotatable around the vertical rotation axis, and deflects the generated beams into the scan region or emits the generated beams, and
    wherein data leads and electrical leads are provided to control a pivoting of the mirror and the rotation of the rotor, wherein the data leads are coupled to the mirror, the rotor, the detector, and an evaluation unit, wherein the detector mirror is disposed on the rotor, wherein the detector mirror can reflect beams, reflected at the object from different directions of incidence, so that the reflected beams are focused into a focal point, which is at a distance from the detector mirror which corresponds to a focal length of the detector mirror, wherein the detector is at a distance corresponding to the focal length of the detector mirror, wherein a detector area of the detector is located at a focal point of the detector mirror, wherein the detector is a point detector, and wherein the focal point of the detector mirror is independent of an orientation of the rotor because the focal point of the detector mirror and a detector area of the detector are located on the vertical rotation axis.

2. The LIDAR apparatus as recited in claim 1, wherein the detector mirror is configured to focus reflected beams of a return beam region onto the detector.

3. The LIDAR apparatus as recited in claim 1, wherein the detector mirror has a focal length, and wherein the detector is disposed at a focal point of the detector mirror.

4. The LIDAR apparatus as recited in claim 1, wherein the detector is a point detector.

5. The LIDAR apparatus as recited in claim 1, wherein the mirror is pivotable around a horizontal rotation axis.

6. The LIDAR apparatus as recited in claim 1, further comprising:
a further mirror, pivotable around a horizontal rotation axis and mounted on a static part of the LIDAR apparatus, to deflect the at least one generated beam onto the mirror that is rotatable around the vertical rotation axis.

7. The LIDAR apparatus as recited in claim 6, further comprising:
at least one optical element to guide the at least one deflected beam over the mirror that is rotatable around the vertical rotation axis.

8. The LIDAR apparatus as recited in claim 1, wherein the detector mirror is a free-form mirror.

9. A method for operating a LIDAR apparatus to scan a scan angle with at least one beam, the method comprising:
generating, with at least one beam source, beams, which are pulsed having a pulse duration at specific time intervals;
deflecting, with a mirror, the generated beams along a horizontal scan angle and along a vertical scan angle; and
focusing at least one reflected beam reflected at an object by a detector mirror onto a detector;
wherein the generated beams are generated congruently with a vertical rotation axis and emitted onto the mirror, which is pivotable around a horizontal rotation axis, wherein the mirror is positioned on a rotor, which is rotatable around the vertical rotation axis, and deflects the generated beams into the scan region or emits the generated beams, and
wherein data leads and electrical leads are provided to control a pivoting of the mirror and the rotation of the rotor, wherein the data leads are coupled to the mirror, the rotor, the detector, and an evaluation unit, wherein the detector mirror is disposed on the rotor, wherein the detector mirror can reflect beams, reflected at the object from different directions of incidence, so that the reflected beams are focused into a focal point, which is at a distance from the detector mirror which corresponds to a focal length of the detector mirror, wherein the detector is at a distance corresponding to the focal length of the detector mirror, wherein a detector area of the detector is located at a focal point of the detector mirror, wherein the detector is a point detector, and wherein the focal point of the detector mirror is independent of an orientation of the rotor because the focal point of the detector mirror and a detector area of the detector are located on the vertical rotation axis.

10. The method as recited in claim 9, wherein each reflected beam from a return beam region is accurately focused onto the detector.

* * * * *